(12) United States Patent
Oba (10) Patent No.: US 9,724,969 B2
(45) Date of Patent: Aug. 8, 2017

(54) MOTORCYCLE TIRE

(71) Applicant: Bridgestone Corporation, Tokyo (JP)

(72) Inventor: Hirofumi Oba, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 217 days.

(21) Appl. No.: 14/565,953

(22) Filed: Dec. 10, 2014

(65) Prior Publication Data

US 2015/0165826 A1 Jun. 18, 2015

(30) Foreign Application Priority Data

Dec. 13, 2013 (JP) ................................. 2013-258449

(51) Int. Cl.
*B60C 11/11* (2006.01)
*B60C 11/03* (2006.01)

(52) U.S. Cl.
CPC ........... *B60C 11/11* (2013.01); *B60C 11/0302* (2013.01); *B60C 2200/10* (2013.01); *B60C 2200/14* (2013.01)

(58) Field of Classification Search
CPC . B60C 2200/10; B60C 11/11; B60C 11/0311; B60C 2011/0313; B60C 11/0327; B60C 11/0306; B60C 2200/12; B60C 2200/14; B60C 11/03
USPC ........... 152/209.11; D12/107, 901, 536, 539, D12/545
See application file for complete search history.

(56) References Cited

U.S. PATENT DOCUMENTS

| 3,842,879 | A | * | 10/1974 | Mills | ....................... B60C 11/00 |
| | | | | | 152/209.11 |
| 4,617,976 | A | * | 10/1986 | Kawajiri | ............... B60C 11/032 |
| | | | | | 152/209.11 |
| 5,318,086 | A | * | 6/1994 | Narumi | ............... B60C 11/0311 |
| | | | | | 152/209.11 |
| D354,465 | S | * | 1/1995 | Detzner | ...................... D12/536 |
| 8,887,778 | B2 | * | 11/2014 | Ishida | ..................... B60C 11/11 |
| | | | | | 152/209.11 |
| 9,290,060 | B2 | * | 3/2016 | Ishida | ..................... B60C 11/11 |
| 2008/0245457 | A1 | * | 10/2008 | Sueishi | .................. B60C 11/01 |
| | | | | | 152/209.11 |

(Continued)

FOREIGN PATENT DOCUMENTS

| JP | 2009067245 A | 4/2009 |
| JP | 2012-46078 A | 3/2012 |
| JP | 2013-006486 A | 1/2013 |

OTHER PUBLICATIONS

Communication dated Apr. 21, 2015 from the Japanese Patent Office in counterpart application No. 2014-219298.

(Continued)

*Primary Examiner* — Eric Hug
(74) *Attorney, Agent, or Firm* — Sughrue Mion, PLLC (57) ABSTRACT

A motorcycle tire that improves straight-line traction performance and also improves turning performance is provided. In a motorcycle tire, a condition of $LC/T \le 0.08$ is satisfied for center blocks, a condition of $LM/LC > 1.0$ is satisfied for the center blocks and intermediate blocks, and the center blocks and the intermediate blocks are either separate from each other in the tire circumferential direction, or overlap each other in the tire circumferential direction with an overlap region of 0.5 LC or less.

5 Claims, 4 Drawing Sheets

(56) References Cited

U.S. PATENT DOCUMENTS

2011/0290390 A1* 12/2011 Matsumura ......... B60C 11/0083
152/209.11

OTHER PUBLICATIONS

Communication dated Jan. 13, 2015 from the Japanese Patent Office in counterpart application No. 2014-219298.

* cited by examiner

MOTORCYCLE TIRE

CROSS-REFERENCE TO RELATED APPLICATION

This application claims priority under 35 USC 119 from Japanese Patent Application, No. 2013-258449 filed Dec. 13, 2013, the disclosure of which is incorporated by reference herein.

PRIOR DISCLOSURE (PUBLICATION) BY INVENTOR

1. Details of Publication
(i) Publication Date: Jun. 15, 2013
(ii) Publication Location: All Japan Motocross Championship, Round 5 Hokkaido Off-Road Park (1719, Izumizawa, Chitose, Hokkaido)
(iii) Publisher: Yamaha YSP Racing Team
  Team SUZUKI
  K.R.T.
  TEAM. MOTO. SPORTS. FUKAYA
  SEKI Racing MotoRoman & KBF-RS
  T. E. SPORT
(iv) Content of Published Invention:
  In Round 5 of the All Japan Motocross Championship, the Yamaha YSP Racing Team, Team SUZUKI, K.R.T., TEAM. MOTO. SPORTS. FUKAYA, SEKI Racing MotoRoman & KBF-RS, and T. E. SPORT used a tire for a motorcycle, being an invention invented by Hirofumi Oba, thereby publishing the same.
2. Details of Transmission of Right to be Granted Patent
(i) Inventor of Published Invention
  Hirofumi Oba (c/o Bridgestone Corporation Technical Center, 3-1-1, Ogawahigashicho, Kodaira, Tokyo)
(ii) Patent Applicant
  Bridgestone Corporation
(iii) Regarding Transmission of Right to be Granted Patent
  The invention published as a result of the public act described in the details of the publication was invented by Hirofumi Oba, and the tire for a motorcycle according to the invention was provided to the Yamaha YSP Racing Team, Team SUZUKI, K.R.T., TEAM. MOTO. SPORTS. FUKAYA, SEKI Racing MotoRoman & KBF-RS, and T. E. SPORT and publication was requested on Jun. 14, 2013.
  The right to be granted a patent according to the invention was assigned by Hirofumi Oba to Bridgestone Corporation on Nov. 25, 2013.
(iv) Regarding the Relationship between the Inventor and the Publisher
  Hirofumi Oba, of his own accord, supplied the tire for a motorcycle to the Yamaha YSP Racing Team, Team SUZUKI, K.R.T., TEAM. MOTO. SPORTS. FUKAYA, SEKI Racing MotoRoman & KBF-RS, and T. E. SPORT for the purpose of usage thereof, and the Yamaha YSP Racing Team, Team SUZUKI, K.R.T., TEAM. MOTO. SPORTS. FUKAYA, SEKI Racing MotoRoman & KBF-RS, and T. E. SPORT performed publication of the tire for a motorcycle as described in the details of the publication.

TECHNICAL FIELD

The present invention relates to a motorcycle tire, and relates in particular to a motorcycle tire for use in Motocross or Enduro where the tire is used for riding on uneven terrain including muddy ground.

RELATED ART

Various tread patterns are proposed for motorcycle pneumatic tires used for running on uneven terrain. In Japanese Patent Application Laid-Open (JP-A) No. 2013-006486, for example, technology is described in which block rigidity in the tire circumferential direction is decreased and straight-line traction performance is improved by disposing blocks on a tread that have a shorter length in the tire circumferential direction than in the tire width direction.

Lowering the block rigidity in tire circumferential direction for a soft road surface does indeed contribute to improving straight-line traction performance; however, running on uneven terrain demands not only straight-line traction performance, but also cornering grip performance (turning performance). However, since the edges for obtaining gripping force when cornering are shortened by shortening the tire circumferential direction length of the blocks, it becomes difficult to realize both straight-line traction performance and turning performance.

SUMMARY

Technical Subject

In consideration of the above circumstances, a subject of the present invention is to provide a motorcycle tire that both improves straight-line traction performance and also improves turning performance.

Solution to Subject

A motorcycle tire of a first aspect of the present invention includes center blocks formed on a tire equatorial plane of a tread, intermediate blocks formed outward of both outer sides in a tire width direction of the center block and shoulder blocks formed outward of both outer sides in the tire width direction of the intermediate blocks; wherein, if T is a length in the tire width direction along a tread surface between both tread edges, WC is a maximum length in the tire width direction of each of the center blocks, SC is a surface area of a tread face of each of the center blocks, and LC is a representative length in a tire circumferential direction of each of the center blocks calculated as a value of the surface area of the tread face SC divided by the tire width direction maximum length WC, then $LC/T \leq 0.08$ is satisfied; wherein, if WM is a maximum length in the tire width direction of each of the intermediate blocks, SM is a surface area of a tread face of each of the intermediate blocks, and LM is a representative length in the tire circumferential direction of each of the intermediate blocks calculated as a value of the surface area of the tread face SM divided by the tire width direction maximum length WM, then $LM/LC > 1.0$ is satisfied; and wherein the center blocks and the intermediate blocks are either separate from each other in the tire circumferential direction, or overlap each other in the tire circumferential direction with an overlap length of 0.5 LC or less.

In the motorcycle tire according to the first aspect, since the center blocks satisfy the condition $LC/T \leq 0.08$, suitable tilting over of the center blocks occurs on sandy and muddy ground. The edges of the center blocks in the direction perpendicular to the tire circumferential direction (the tire width direction) thereby operate effectively on the road surface, enabling the straight-line traction performance to be improved.

In the motorcycle tire according to the first aspect, the center blocks and the intermediate blocks satisfy the condition LM/LC>1.0, and the representative length LM in the tire circumferential direction of each of the intermediate blocks is set longer than the representative length LC in the tire circumferential direction of each of the center blocks. The edges in the direction perpendicular to the tire width direction are set relatively longer for the intermediate blocks where ground contact pressure increases during turning, while the edges in the direction perpendicular to the tire width direction are set shorter for the center blocks, thereby, enabling the turning performance to be improved.

In the motorcycle tire according to the first aspect, the center blocks and the intermediate blocks are either separate from each other in the tire circumferential direction, or the overlap length in the tire circumferential direction is 0.5 LC or less. This means that, in cases in which the overlap length in the tire circumferential direction between the center blocks and the intermediate blocks is 0 (in cases in which there is no overlap), the center block and the intermediate block are separate from each other in the tire circumferential direction.

By disposing the center blocks and the intermediate blocks in the tire circumferential direction as described above, overlap of edge portions of the respective blocks in the tire circumferential direction is suppressed, thus enabling turning performance to be secured.

In a motorcycle tire of a second aspect of the present invention, the center blocks and the intermediate blocks are either separate from each other in the tire circumferential direction, or overlap each other in the tire circumferential direction with an overlap length of 0.2 LC or less.

By disposing the center block and the intermediate blocks in the tire circumferential direction as described above, overlap of edge portions of the respective blocks in the tire circumferential direction is further suppressed, thus enabling turning performance to be secured.

In a motorcycle tire of a third aspect of the present invention, the center blocks and the intermediate blocks are separate from each other in the tire circumferential direction.

By separating the center blocks and the intermediate blocks in the tire circumferential direction as described above, there is no overlap of edge portions of the respective blocks in the tire circumferential direction, thus enabling turning performance to be secured.

In a motorcycle tire of a fourth aspect of the present invention, a relationship between the tire width direction maximum length WC of each of the center blocks, the tire width direction maximum length WM of each of the intermediate blocks, and a maximum length WS in the tire width direction of each of the shoulder blocks satisfies WC>WM>WS.

Setting the tire width direction lengths of each of the center blocks, the intermediate blocks and the shoulder blocks in this way increases edge portions in the tire width direction of the blocks on the tire equatorial plane that make a large contribution to straight-line traction performance, enabling the straight-line traction performance to be effectively improved.

In a motorcycle tire of a fifth aspect of the present invention, tire width direction maximum length WM and the tire circumferential direction representative length LM of each the intermediate blocks satisfy 1.2≤WM/LM.

By setting the relationship between the tire width direction length and the tire circumferential direction length of each of the intermediate blocks in this way, appropriate tilting over of the intermediate blocks occurs on sandy and muddy ground.

The edges of the intermediate blocks in the direction perpendicular to the tire circumferential direction (the tire width direction) thereby being function effectively on the road surface, enabling the straight-line traction performance to be still further improved.

Advantageous Effects of Invention

As explained above, the motorcycle tire of the present invention has the excellent advantageous effects of enabling straight-line traction performance to be improved, and turning performance to also be improved.

DETAILED DESCRIPTION OF THE INVENTION

Explanation follows regarding an exemplary embodiment of the invention, based on the drawings. A motorcycle tire 10 according to the present exemplary embodiment is a motorcycle tire for use in Motocross or Enduro where the tire is used to ride on uneven terrain including muddy ground. W indicates the tire width direction, and S indicates the tire circumferential direction of the motorcycle tire 10 described below. The motorcycle tire 10 of the present exemplary embodiment also has a designated tire rotation direction, and this rotation direction is indicated by R.

The length between one tread edge E and the other tread edge E, the tread edges are running along the surface of a tread 12 (the tread periphery) is indicated by T. Note that the "tread edge E" is outside edge in the tire width direction of tread faces of blocks that are formed at the furthermost outside in the tire width direction.

Figure 3:
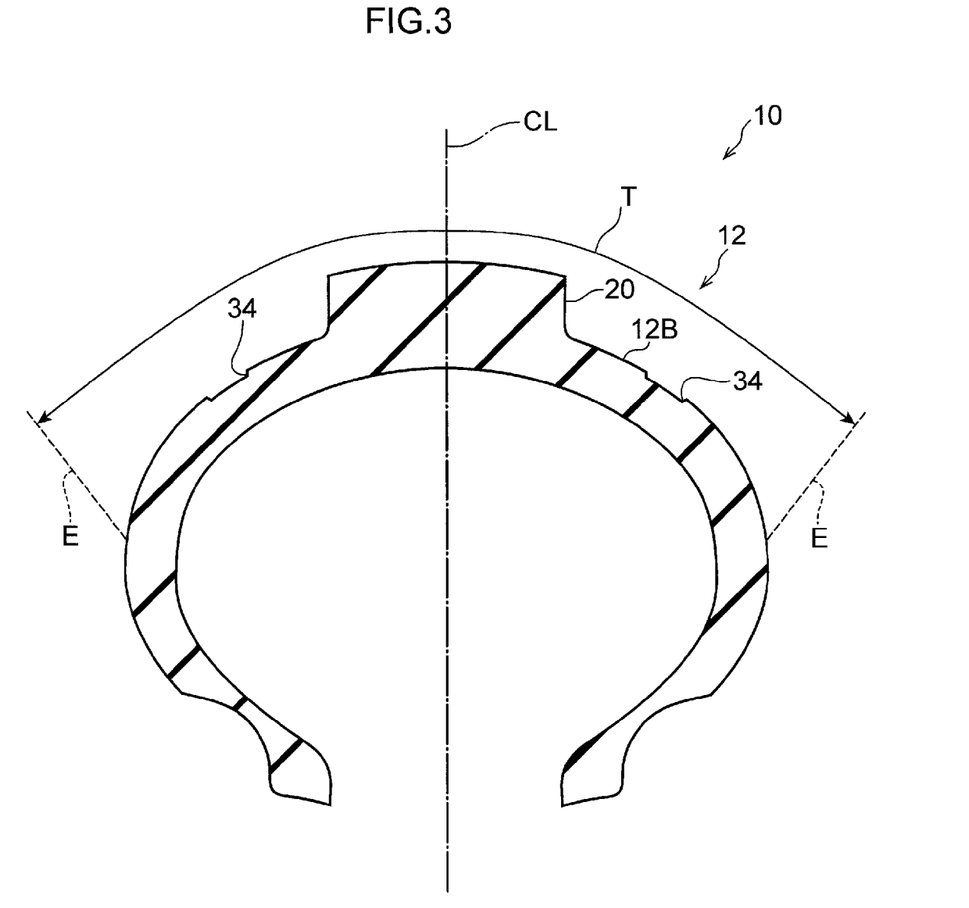
FIG. 3 is a cross-section view taken along line B-B in FIG. 2.
Figure 4:
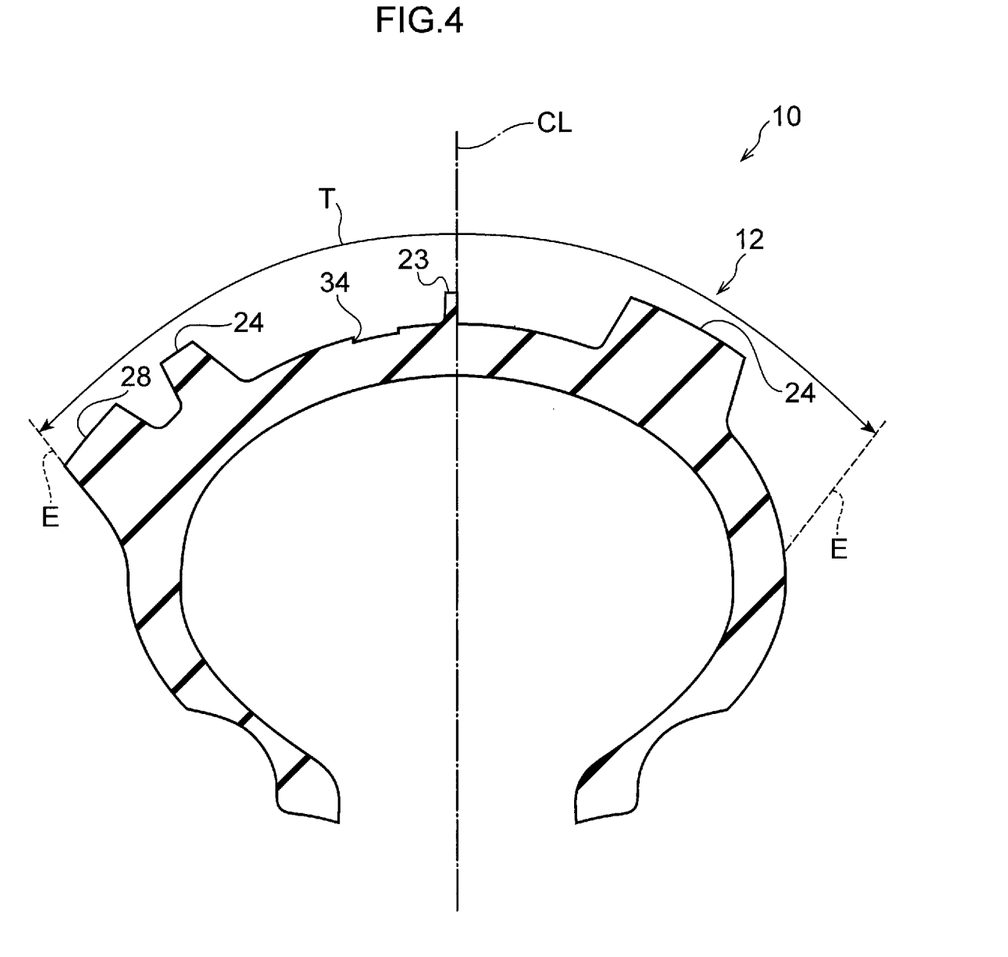
FIG. 4 is a cross-section view taken along line A-A in FIG. 2.

A portion of the tread 12 where no blocks, recessed portions, or the like are formed is referred to as a bottom portion 12B, described later. Tire configuration members such as a carcass, a belt cord and beads are omitted in the tire cross-section views of FIG. 3 and FIG. 4.

Figure 1:
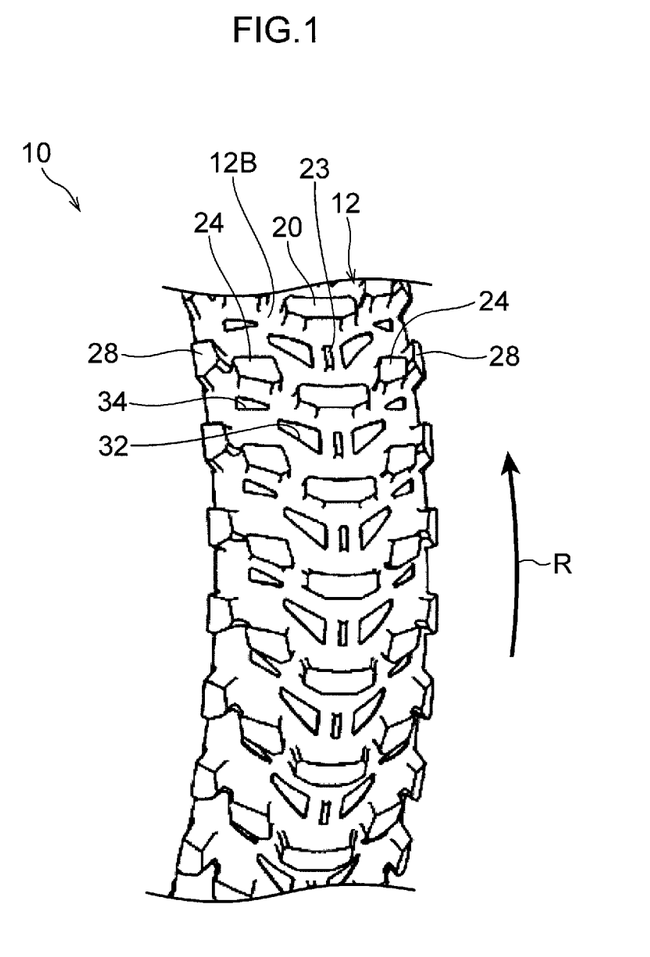
FIG. 1 is a perspective view illustrating a tire circumferential direction portion of a motorcycle tire of an exemplary embodiment.
Figure 2:
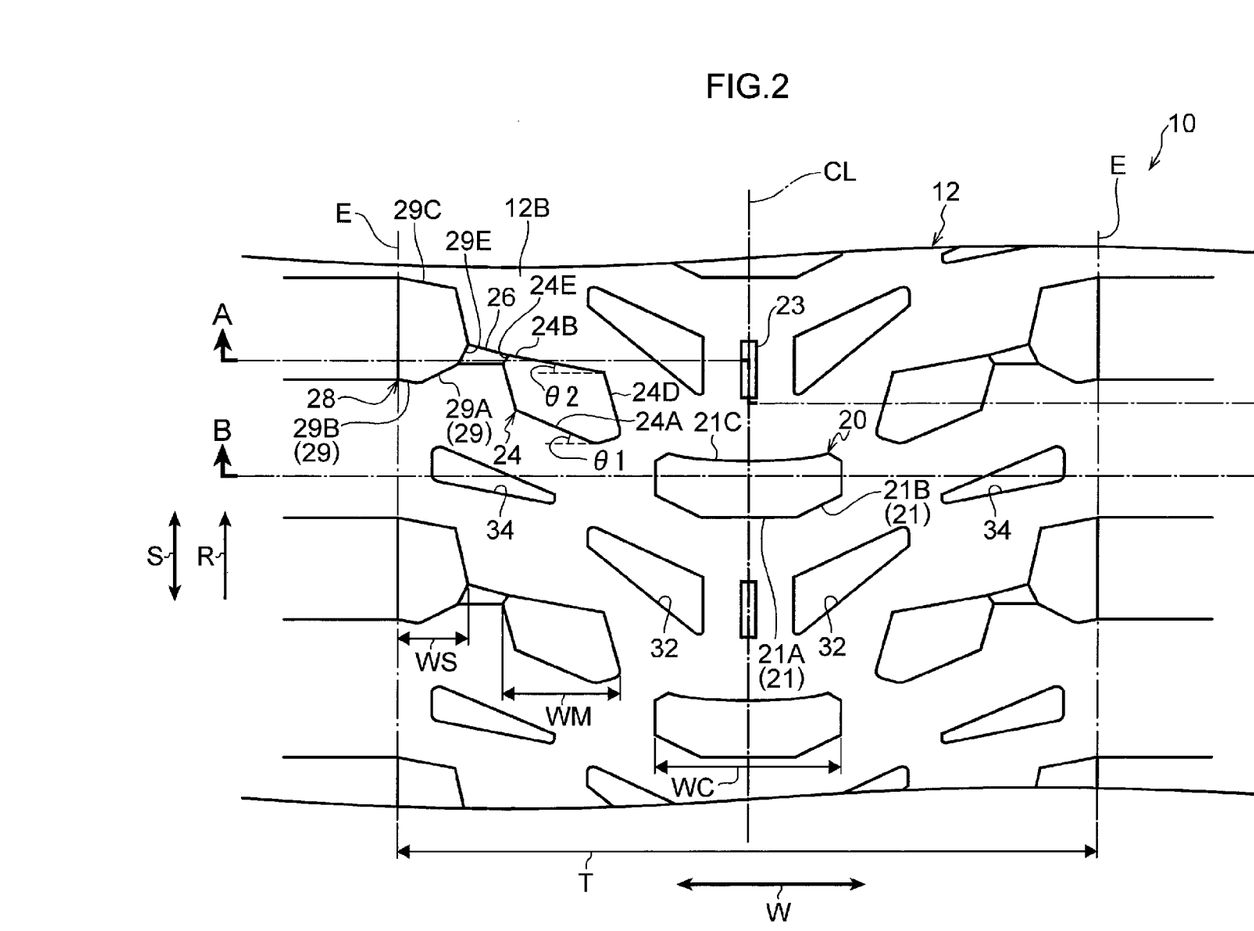
FIG. 2 is an opened-out view of a motorcycle tire of an exemplary embodiment.

As illustrated in FIG. 1 and FIG. 2, the tread 12 of the motorcycle tire 10 is formed with center blocks 20, intermediate blocks 24, and shoulder blocks 28.

The center blocks 20 are formed on a tire equatorial plane CL of the tread 12. The plural center blocks 20 are disposed at specific intervals around the entire circumference of the tire equatorial plane CL. Each of the center blocks 20 is configured with line symmetry on each side of the tire equatorial plane CL. In plan view, each of the center blocks 20 is configured with the length in the tire width direction longer than that in the tire circumferential direction, as a polygonal shape in which outside end portions at tire shoulder sides incline slightly toward tread-in side of the block.

An edge 21 at a kick-off side of each of the center blocks 20 is formed by a center edge 21A that crosses the tire equatorial plane CL and runs along the tire width direction W, and inclined edges 21B that extend from both ends of the center edge 21A toward the tire shoulder sides. The tire shoulder sides of the inclined edges 21B incline toward the tire rotation direction R.

An edge 21C at a tread-in side of each of the center blocks 20 crosses the tire equatorial plane CL, and tire shoulder sides thereof curve slightly toward the tire rotation direction R.

WC, SC, and LC are set so as to satisfy Equation 1 wherein, for the center block 20, WC is the maximum length in the tire width direction, SC is the surface area of the tread face, LC is a representative length in the tire circumferential direction calculated as a value of the surface area of the tread face SC divided by the tire width direction maximum length WC, and T is the tread periphery.

$$LC/T \leq 0.08 \quad \text{(Equation 1)}$$

Satisfying Equation 1 above shortens the tire circumferential direction length of the center block 20 relative to the tread periphery and reduces the block rigidity in the tire circumferential direction of the center block 20, enabling straight-line traction performance of the tire 10 to be improved. Note that, in consideration of durability of the center blocks 20, LC/T is preferably 0.04 or more.

A raised center portion 23 is formed partway between each of the adjacent center blocks 20 in the tire circumferential direction. The raised center portion 23 is rectangular shaped with the tire circumferential direction as the length direction, and is disposed on the tire equatorial plane CL. The height of the raised center portions 23 is set lower than the center blocks 20. Providing the raised center portions 23 creates resistance to mud flow in the tire width direction, thereby enabling the lateral slide performance to be improved, and the turn performance on muddy ground to be improved. Moreover since the block height of the raised center portions 23 is set low, the flow of mud is not completely obstructed, enabling mud sweeping performance to be secured.

The intermediate blocks 24 are formed at both outer sides in the tire width direction W of the center blocks 20. The plural intermediate blocks 24 are disposed at specific intervals around the entire circumference in the tire circumferential direction. The intermediate blocks 24 at one side and the other side of the interposed center blocks 20 are configured with line symmetry to each other on each side of the tire equatorial plane CL. In plan view, each of the intermediate blocks 24 is configured with the length in the tire width direction longer than that in the tire circumferential direction, and as a polygonal shape inclined toward the tire rotation direction R on progression toward the tire shoulder sides. WM and LM are set so as to satisfy Equation 2, wherein WM is the maximum length in the tire width direction of the intermediate block 24, and LM is a representative length in the tire circumferential direction calculated as a value of a surface area of the tread face SM of the intermediate block 24 divided by the tire width direction maximum length WM.

$$1.2 \leq WM/LM \quad \text{(Equation 2)}$$

Satisfying Equation 2 above shortens the tire circumferential direction length of the intermediate blocks 24 relative to the tire width direction length, and reduces the block rigidity in the tire circumferential direction of the intermediate block 24, enabling the straight-line traction performance of the tire 10 to be improved.

A tire shoulder side of a kick-off side edge 24A and a tire shoulder side of a tread-in side edge 24B of each of the intermediate blocks 24 incline toward the tire rotation direction R. An incline angle $\theta 1$ of the kick-off side edge 24A with respect to the tire width direction W is set greater than an incline angle $\theta 2$ of the tread-in side edge 24B with respect to tire width direction W. Setting the angles in this way enables the tread-in side edge 24B, that is essential for straight-line traction performance, and a circumferential direction edge 24D that is located at the tire width direction inside and that is essential for turning performance, to be effectively secured within a limited block surface area of the tread face.

LM and LC are set so as to satisfy Equation 3, wherein LM is the tire circumferential direction representative length of the intermediate block 24 and LC is the tire circumferential direction representative length of the center block 20.

$$LM/LC > 1.0 \quad \text{(Equation 3)}$$

By satisfying Equation 3 above, tire circumferential direction representative length LM of the intermediate block 24 is longer than the tire circumferential direction representative length LC of the center block 20. Accordingly, the edge portion in the tire circumferential direction S of the center blocks 20 is set shorter and the edge portion in the tire circumferential direction S of the intermediate blocks 24 is set relatively longer. This enables the turning performance to be improved as a ground contact pressure increases during turning at the intermediate blocks 24. Note that, LM/LC is preferably less than 2.5.

The center blocks 20 and the intermediate blocks 24 are separate to each other, and do not overlap each other in the tire circumferential direction. Note that the center blocks 20 and the intermediate blocks 24 may overlap with each other in the tire circumferential direction within an overlap length of 0.5 LC or less, with an overlap length of 0.2 LC or less being more preferable, and separation without overlap being still more preferable.

The shoulder blocks 28 are formed at both outer sides in the tire width direction of the intermediate blocks 24. The plural shoulder blocks 28 are disposed at specific intervals around the entire circumference in the tire circumferential direction S. The shoulder blocks 28 are configured with line symmetry to each other with respect to the tire equatorial plane CL on one side and the other side of the tire equatorial plane CL of the tread 12. In plan view, each of the shoulder blocks 28 is formed in a polygonal shape with its length in the tire circumferential direction S longer than its length in the tire width direction W.

A kick-off side edge 29 of each of the shoulder blocks 28 is formed by an inside kick-off edge 29A where the shoulder side of the kick-off edge 29A inclines toward the opposite direction to the rotation direction R on progression toward the shoulder side, and an outside kick-off edge 29B where the shoulder side of the outside kick-off edge 29B inclines from the inside kick-off edge 29A toward the tire rotation direction R on progression toward the shoulder side. A tread-in edge 29C of the shoulder block 28 inclines toward the tire rotation direction R on progression toward the shoulder side. A shoulder side end portion 24E of the tread-in side edge 24B of the intermediate block 24, and a tire equatorial plane CL side end portion 29E of the kick-off edge 29A of the shoulder block 28 are coupled together by a raised-bottom coupling portion 26. The height of each of the raised-bottom coupling portions 26 is set higher than the tread bottom portion 12B and lower than the tread face.

The tire width direction maximum length WC of the center blocks 20, the tire width direction maximum length WM of the intermediate block 24, and the maximum length WS in the tire width direction of the shoulder blocks 28 satisfy the conditions in Equation 4 below.

$$WC > WM > WS \quad \text{(Equation 4)}$$

Setting the tire width direction lengths of the center blocks 20, the intermediate blocks 24, and the shoulder blocks 28 in this way increases edge portions in the tire width direction of the blocks disposed on the tire equatorial plane that make a large contribution to straight-line traction performance, enabling the straight-line traction performance of the tire 10 to be effectively improved.

The tread bottom portion 12B is formed with first recessed portions 32 at both tire width direction sides of the raised center portions 23. Each of the first recessed portions 32 is formed slightly lower than the tread bottom portion 12B. The first recessed portion 32 is formed in a substantially triangular shape, with one edge of the triangle disposed along the tire circumferential direction, and the other two edges extending with the shoulder sides thereof inclining toward the tire tread-in side on progression toward the shoulder sides.

The tread bottom portion 12B is formed with second recessed portions 34 on a line extending from the shoulder sides of the first recessed portions 32. Each of the second recessed portions 34 is formed slightly lower than the tread bottom portion 12B. The second recessed portion 34 is formed in a substantially triangular shape, with one edge of the triangle disposed in a direction running along the tire circumferential direction between adjacent shoulder blocks 28, and the other two edges extending toward the tire equatorial plane CL, such that the tire equatorial plane CL sides of the second recessed portions 34 extend at an incline toward the tire kick-off side.

Forming the first recessed portions 32 and the second recessed portions 34 enables the rubber gauge of the tread portion to be made more uniform, and the carcass line to be made more uniform. This enables variation in force generated by the tire to be reduced, and handling stability to be improved.

In the motorcycle tire 10 of the present exemplary embodiment, the tire circumferential direction representative length of the center blocks 20 LC satisfies LC/T≤0.08 (Equation 1). The center blocks 20 accordingly tilt over appropriately on sandy or muddy ground. The edges of the center blocks 20 in the direction perpendicular to the tire circumferential direction (the tire width direction) thereby operate effectively on the road surface, enabling the straight-line traction performance to be improved.

In the motorcycle tire 10 of the present exemplary embodiment, the tire circumferential direction representative length LC of the center block 20 and the tire circumferential direction representative length LM of the intermediate block 24 satisfy LM/LC>1.0 (Equation 3). The edges in a direction perpendicular to the tire width direction, set shorter for the center blocks 20, while the edges in a direction perpendicular to the tire width direction re set relatively longer for the intermediate blocks 24 where the ground contact pressure increases during turning, thereby enabling the turning performance to be improved.

In the motorcycle tire 10 of the present exemplary embodiment, the center blocks 20 and the intermediate blocks 24 are separated from each other in the tire circumferential direction. As a result, there is no overlap of edge portions of any of the blocks in the tire circumferential direction, thus enabling turning performance to be secured.

In the motorcycle tire 10 of the present exemplary embodiment, the relationship between the tire width direction maximum length WC of the center block 20, the tire width direction maximum length WM of the intermediate block 24, and the tire width direction maximum length WS of the shoulder block 28 satisfies WC>WM>WS (Equation 4). This enables the tire width direction edge portions of the blocks on the tire equatorial plane that make a large contribution to straight-line traction performance to be increased, and enables straight-line traction performance to be effectively improved.

EXAMPLES

In order to confirm the advantageous effects of the motorcycle tire according to the present invention, motorcycle tires of Examples 1 to 6 and Comparative Examples 1 to 4 were prepared. The values of LC/T relating to (Equation 1), the values of WM/LM relating to (Equation 2), and the values of LM/LC relating to (Equation 3) for the Examples 1 to 6 and the Comparative Examples 1 to 4 were set as indicated in Table 1. Regarding overlap amount in the tire circumferential direction of the center blocks 20 and the intermediate blocks 24, the values indicated in Table 1 were set in cases of overlap, and are indicated by the FIG. 0 in cases of separation (no overlap). In cases in which (Equation 4) WC>WM>WS was satisfied, this is indicated by a "Y" in Table 1, and in cases in which (Equation 4) was not satisfied, this is indicated by a "N".

Evaluation was performed by a sensory evaluation score of a professional Motocross rider. A score of 10 points was the maximum score, and scoring was performed for both straight-line traction performance and turning performance. The tires used had a bias structure and a size of 110/90-19. The evaluation results are indicated in Table 1.

TABLE 1

|  | LC/T | LM/LC | Circumferential Direction Overlap Region | WC/WM/WS | WM/LM | Straight-Line Traction | Cornering Grip |
|---|---|---|---|---|---|---|---|
| Example 1 | 0.07 | 1.1 | 0 | Y: WC > WM > WS | 1.3 | 10 | 9 |
| Example 2 | 0.07 | 1.1 | 0.18 LC | Y: WC > WM > WS | 1.3 | 8 | 6 |
| Example 3 | 0.07 | 1.1 | 0.45 LC | Y: WC > WM > WS | 1.3 | 8 | 5.5 |
| Example 4 | 0.07 | 1.1 | 0 | N: WC > WS > WM | 1.3 | 7.5 | 7.5 |
| Example 5 | 0.07 | 1.1 | 0 | Y: WC > WM > WS | 1.1 | 8 | 7.5 |
| Example 6 | 0.07 | 1.1 | 0 | N: WC > WS > WM | 1.1 | 7 | 6.5 |
| Comparative Example 1 | 0.09 | 1.1 | 0 | Y: WC > WM > WS | 1.3 | 6 | 7.5 |
| Comparative Example 2 | 0.07 | 0.9 | 0.45 LC | Y: WC > WM > WS | 1.3 | 8 | 4.5 |

TABLE 1-continued

| | LC/T | LM/LC | Circumferential Direction Overlap Region | WC/WM/WS | WM/LM | Straight-Line Traction | Cornering Grip |
|---|---|---|---|---|---|---|---|
| Comparative Example 3 | 0.07 | 1.1 | 0.55 LC | Y: WC > WM > WS | 1.3 | 8 | 5 |
| Comparative Example 4 | 0.09 | 1.1 | 0 | N: WC > WS > WM | 1.1 | 5 | 6.5 |

In Table 1, favorable results of 7 points or more were obtained for straight-line traction performance for Examples 1 to 6. Moreover, favorable results of 13.5 points or more were obtained for straight-line traction performance and turning performance combined. It can therefore be confirmed that turning performance can be secured while improving straight-line traction performance.

What is claimed is:

1. A motorcycle tire comprising:

center blocks formed on a tire equatorial plane of a tread;

intermediate blocks formed outward of both outer sides in a tire width direction of the center block; and shoulder blocks formed outward of both outer sides in the tire width direction of the intermediate blocks;

wherein, if T is a length in the tire width direction along a tread surface between both tread edges, WC is a maximum length in the tire width direction of each of the center blocks, SC is a surface area of a tread face of each of the center blocks, and LC is a representative length in a tire circumferential direction of each of the center blocks calculated as a value of the surface area of the tread face SC divided by the tire width direction maximum length WC, then LC/T≤0.08 is satisfied;

wherein, if WM is a maximum length in the tire width direction of each of the intermediate blocks, SM is a surface area of a tread face of each of the intermediate blocks, and LM is a representative length in the tire circumferential direction of each of the intermediate blocks calculated as a value of the surface area of the tread face SM divided by the tire width direction maximum length WM, then LM/LC>1.0 is satisfied;

wherein the center blocks and the intermediate blocks are either separate from each other in the tire circumferential direction, or overlap each other in the tire circumferential direction with an overlap length of 0.5 LC or less;

wherein a tire shoulder side of a kick-off side edge and a tire shoulder side of a tread-in side edge of each of the intermediate blocks incline toward a tire rotation direction; and wherein an incline angle of the kick-off side edge with respect to the tire width direction is set greater than an incline angle of the tread-in side edge with respect to the tire width direction.

2. The motorcycle tire of claim 1, wherein the center blocks and the intermediate blocks are either separate from each other in the tire circumferential direction, or overlap each other in the tire circumferential direction with an overlap length of 0.2 LC or less.

3. The motorcycle tire of claim 1, wherein the center blocks and the intermediate blocks are separate from each other in the tire circumferential direction.

4. The motorcycle tire of claim 1, wherein a relationship between the tire width direction maximum length WC of each of the center blocks, the tire width direction maximum length WM of each of the intermediate blocks, and a maximum length in the tire width direction of each of the shoulder blocks WS satisfies WC>WM>WS.

5. The motorcycle tire of claim 1, wherein the tire width direction maximum length WM of each of the intermediate blocks and the tire circumferential direction representative length of each of the intermediate blocks LM satisfy 1.2≤WM/LM.

* * * * *